United States Patent [19]

Lang

[11] Patent Number: 4,565,742
[45] Date of Patent: Jan. 21, 1986

[54] PROCESS FOR FORMING A SEALANT WEB-PVDC-BASE FILM LAMINATE

[75] Inventor: Theodore J. Lang, Kingston, Canada

[73] Assignee: Du Pont Canada Inc., Mississauga, Canada

[21] Appl. No.: 543,759

[22] Filed: Oct. 20, 1983

[51] Int. Cl.[4] .......................... B32B 27/08; B05D 3/02
[52] U.S. Cl. .................................. 428/476.3; 427/316;
427/379; 427/385.5; 427/412.1; 427/412.3;
427/412.5; 428/483; 428/515; 428/518
[58] Field of Search ....................... 428/476.1, 518, 483,
428/476.3, 515, 520; 427/385.5, 379, 412.1, 316,
412.3, 412.5

[56] References Cited

U.S. PATENT DOCUMENTS

| | | | |
|---|---|---|---|
| 3,741,253 | 6/1973 | Brax et al. | 428/520 X |
| 4,188,443 | 2/1980 | Mueller et al. | 428/518 X |
| 4,399,181 | 8/1983 | Yoshimura et al. | 428/476.1 |
| 4,452,842 | 6/1984 | Borges et al. | 428/476.1 X |

OTHER PUBLICATIONS

R. A. Wessling, "Polyvinylidene Chloride", Publ. by Gordon and Breach Science Publishers, New York, 1977, pp. 1-5, 172-185.

Primary Examiner—Thomas J. Herbert

[57] ABSTRACT

A film laminate comprising a base film and a first sealant web with a coating of polyvinylidene chloride (PVDC) sandwiched therebetween is disclosed. The first sealant web is selected from the group consisting of (a) film made from a copolymer of ethylene and vinyl acetate, and (b) a film made from a blend of (i) a copolymer of ethylene and vinyl acetate with (ii) a homopolymer of ethylene, or a copolymer of ethylene and one or more $C_4$ to $C_{10}$ α-olefins, said homopolymer or copolymer having a density of from about 0.915 to about 0.955 $g/cm^3$, or blends of said homopolymer and copolymer. The base film is selected from the group consisting of oriented nylon film, oriented polyester film, oriented polypropylene film and a second sealant web, said second sealant web being selected from the same group as said first sealant web and having a slip coefficient of less than about 0.4. The PVDC coating consists of at least one layer, the layers being characterized by having a crystallinity index of less than 1.15 if dried and allowed to stand for 30 days at 20° C. and, if the base film is selected from nylon film, polyester film or polyproylene film, the layer in contact with the base film being further characterized by having a crystallinity index of from 1.12 to 1.25 if dried and allowed to stand for 5 days at 40° C. A process for forming the laminate is also disclosed. The process comprises bringing the base film and the first sealant web together between a nip roll and a hot roll, said PVDC coating having been applied to at least the base film or the first sealant web, with the provisio that if the first or second sealant web is in contact with the hot roll then said web which contacts the hot roll has a slip coefficient of less than about 0.4. The laminates may be used for packaging comestibles e.g. bacon, weiners and cheese.

14 Claims, 1 Drawing Figure

PROCESS FOR FORMING A SEALANT WEB-PVDC-BASE FILM LAMINATE

The present invention relates to heat lamination of a sealant web to a polyvinylidene chloride-coated base film. Hereinafter polyvinylidene chloride is referred to as PVDC.

Laminates of base films and a sealant web having a PVDC coating sandwiched therebetween are useful for packaging comestibles e.g. bacon, weiners and cheese. Examples of the base film are nylon, polyester and polypropylene films; an example of a sealant web is polyethylene. Usually such laminates are prepared by so-called adhesive lamination of the sealant web to the PVDC coating of the PVDC-coated base film. It is usual in such adhesive lamination processes to spread an adhesive, dissolved in a solvent, onto the PVDC coating and to allow the solvent to evaporate until the adhesive is tacky. The sealant web is then pressure laminated to the tacky adhesive-coated PVDC. The adhesive is usually a urethane adhesive. Such urethanes may be dissolved in volatile organic solvents e.g. acetone, ethyl acetate or toluene.

There are several drawbacks to adhesive lamination of sealant webs to PVDC coatings. One drawback relates to the use of the volatile organic solvents, which tend to be highly flammable, expensive and not easily recoverable. It is desirable, therefore, from a safety standpoint, to use aqueous adhesives or adhesive-less processes in order to remove or reduce the fire hazards. Another drawback relates to the type of PVDC that may be used. In order to prevent the PVDC from being attacked by the solvent used in an adhesive lamination process, crystalline PVDC's must be used. However, crystalline PVDC's generally do not adhere well to the aforementioned base films and it is usually necessary to bond the crystalline PVDC to the base film with a primer. For example, an amorphous PVDC primer, as taught in Canadian Patent Application No. 391 235 of T. J. Lang, filed Dec. 1, 1981, may be used to adhere nylon film to a crystalline PVDC.

Another technique for producing laminates of two plastic films with PVDC sandwiched therebetween is to coat one of the plastic films with a so-called PVDC barrier adhesive and then to heat-laminate the second plastic film to the barrier adhesive. Barrier adhesives are available for coating oriented polypropylene, medium density polyethylene (density of about 0.935 to 0.945 g/cm$^3$), nitrocellulose-coated regenerated cellulose and nylon films. Such barrier adhesives allegedly may be heat laminated to low density polyethylene film. It has been found, however, that the bond strength with so-called slip-modified low density polyethylene film i.e. a low density polyethylene film containing a slip additive, is only about 10–20 g/cm as measured on a Suter* tester. Commercially acceptable bond strengths are thought to be in excess of about 100 g/cm.

*denotes trade mark.

A laminate, and a process for forming the laminate, of a first sealant web and a base film, in which the base film is nylon film, oriented polypropylene film, oriented polyester film, or a second sealant web, which laminate has a PVDC layer between the first sealant web and the base film, which is made by a process which is not an adhesive lamination process and which has commercially acceptable bond strengths has now been found.

Accordingly, the present invention provides a film laminate comprising a base film and a first sealant web with a coating of PVDC sandwiched therebetween;

said first sealant web being selected from the group consisting of (a) a film made from a copolymer of ethylene and vinyl acetate, and (b) a film made from a blend of (i) a copolymer of ethylene and vinyl acetate with (ii) a homopolymer of ethylene, or a copolymer of ethylene and one or more C$_4$ to C$_{10}$ α-olefins, said homopolymer or copolymer having a density of from about 0.915 to about 0.955 g/cm$^3$, or blends of said homopolymer and copolymer, said base film being selected from the group consisting of oriented nylon film, oriented polyester film, oriented polypropylene film, cast nylon film and a second sealant web, said second sealant web being selected from the same group as said first sealant web and having a slip coefficient of less than about 0.4;

said PVDC coating consisting of at least one layer, the layers being characterized by having a crystallinity index of less than 1.15 if dried and allowed to stand for 30 days at 20° C. and, if the base film is selected from nylon film, polyester film and polypropylene film, the layer in contact with the base film being further characterized by having a crystallinity index of from 1.12 to 1.25 if dried and allowed to stand for 5 days at 40° C.

The present invention also provides a process for forming the laminate of the present invention comprising bringing the base film and the first sealant web together between a nip roll and a hot roll, said PVDC coating having been applied to at least the base film or the first sealant web, with the proviso that if the first or second sealant web is in contact with the hot roll, then said sealant web that contacts the hot roll has a slip coefficient of less than about 0.4.

In one embodiment the process comprises:

(a) heating a PVDC-coated base film or a first sealant web to an extend sufficient to reduce the crystallinity index of the PVDC coating to less than about 1.05;

(b) passing the heated PVDC-coated base film or first sealant web over a hot roll; and (c) when a PVDC-coated base film is used, bringing the first sealant web into contact with the PVDC coating and nipping said first sealant web to the PVDC coated base film, between the nip roll and the hot roll, to form a laminate, and when a PVDC-coated first sealant web is used, bringing the base film into contact with the PVDC-coated first sealant web, between the nip roll and the hot roll, to form a laminate.

In other embodiments of the process, a PVDC-coated base film or first sealant web is taken and a further coating of PVDC is applied to the base film or the first sealant web prior to forming the laminate by heat lamination. Specific embodiments are shown hereinbelow as Processes A, B, C and D.

Process A comprises:

(a) heating the PVDC-coated base film to an extent sufficient to reduce the crystallinity index of the PVDC coating to less than about 1.05, said PVDC being characterized by having a crystallinity index of less than 1.15 if dried and allowed to stand for 30 days at 20° C. and, if the base film is selected from nylon film, polyester film or polypropylene film, the PVDC coating being further characterized by having a crystallinity index of from 1.12 to 1.25 if dried and allowed to stand for 5 days at 40° C.;

(b) coating the PVDC-coated base film with an aqueous PVDC dispersion to form a second PVDC coating, said second PVDC being characterized by having a crystallinity index of less than 1.15 if dried and allowed to stand for 30 days at 20° C.;

(c) drying and subsequently heating the second PVDC coating until the temperature of the free surface of said second coating is less than 75° C.;

(d) passing the resulting PVDC-coated base film over a hot roll, said base film being in contact with said hot roll, said hot roll being at a temperature higher than about 70° C., and (e) bringing the first sealant web into contact with the second PVDC coating and nipping said first sealant web to the PVDC-coated base film, between a nip roll and the hot roll to form a laminate.

Process B comprises:

(a) heating the PVDC-coated base film to an extent sufficient to reduce the crystallinity index of the PVDC coating to less than about 1.05, said PVDC being characterized by having a crystallinity index of less than 1.15 if dried and allowed to stand for 30 days at 20° C. and, if the base film is selected from nylon film, polyester film or polypropylene film, the PVDC coating being further characterized by having a crystallinity index of from 1.12 to 1.25 if dried and allowed to stand for 5 days at 40° C.

(b) coating the first sealant web having a surface tension of at least 42 dynes/cm, with an aqueous PVDC dispersion to form a PVDC-coated sealant web, said PVDC coating on the first sealant web being characterized by having a crystallinity index of less than 1.15 if dried and allowed to stand for 30 days at 20° C.;

(c) drying the PVDC coating on the first sealant web;

(d) passing the PVDC-coated base film over a roll, said base film being in contact with said hot roll, said hot roll being at a temperature higher than about 70° C.; and (e) bringing the PVDC surface of the PVDC-coated first sealant web into contact with the PVDC surface of the PVDC-coated base film and nipping said PVDC-coated first sealant web to the PVDC-coated base film, between a nip roll and the hot roll, to form a laminate.

Process C comprises:

(a) coating the PVDC-coated first sealant web with an aqueous PVDC dispersion to form a second PVDC coating, said second PVDC coating being characterized by having a crystallinity index of less than 1.15 if dried and allowed to stand for 30 days at 20° C. and, if the base film is selected from nylon film, polyester film or polypropylene film, the second PVDC coating being further characterized by having a crystallinity index of from 1.12 to 1.25 if dried and allowed to stand for 5 days at 40° C., and said PVDC coating adjacent to the first sealant web being characterized by having a crystallinity index of less than 1.15 if dried and allowed to stand for 30 days at 20° C.;

(b) drying the second PVDC coating;

(c) passing a base film over a hot roll, said base film being in contact with said hot roll, said hot roll being at a temperature higher than about 70° C., and (d) bringing the base film into content with the second PVDC coating and nipping said base film to the PVDC-coated first sealant web, between a nip roll and the hot roll, to form a laminate.

Process D comprises:

(a) coating the base film with an aqueous PVDC dispersion, the resultant coating being characterized by having a crystallinity index of less than 1.15 if dried and allowed to stand for 30 days at 20° C. and, if the base film is selected from nylon film, polyester film or polypropylene film, the PVDC coating being further characterized by having a crystallinity index of from 1.12 to 1.25 if dried and allowed to stand for 5 days at 40° C.;

(b) drying the PVDC coating;

(c) passing the PVDC-coated base film over a hot roll, said base film being in contact with said hot roll, and said hot roll being at a temperature higher than about 70° C.; and (d) bringing the PVDC-coated surface of a PVDC-coated first sealant web into contact with the PVDC-coated surface of the PVDC-coated base film and nipping the PVDC-coated first sealant web to the PVDC-coated base film, between a nip roll and the hot roll, to form a laminate.

In further embodiments of the process, a base film or first sealant web is taken and a coating of PVDC is applied to the base film and/or the first sealant web prior to forming the laminate by heat lamination. Specific embodiments are shown hereinbelow as Processes E, F and G.

Process E comprises:

(a) coating the base film with a first PVDC, the coating being characterized by having a crystallinity index of less than 1.15 if dried and allowed to stand for 30 days at 20° C. and, if the base film is selected from nylon film, polyester film or polypropylene film, the first PVDC coating being further characterized by a crystallinity index of from 1.12 to 1.25 if dried and allowed to stand for 5 days at 40° C.;

(b) coating the PVDC-coated base film formed in step (a) with a second PVDC, the second coating being characterized by having a crystallinity index of less than 1.15 if dried and allowed to stand for 30 days at 20° C., to form a second PVDC coating;

(c) heating the said second coating until the temperature of the free surface of said second coating is less than 75° C.;

(d) passing the resulting PVDC-coated base film over a hot roll, said base film being in contact with said hot roll, and said hot roll being at a temperature higher than about 70° C., and (f) bringing the sealant web into contact with the second PVDC coating and nipping said sealant web to the PVDC-coated base film, between a nip roll and the hot roll, to form a laminate.

Process F comprises:

(a) coating a first sealant web, having a surface tension of at least 38 dynes/cm, with a first PVDC, the coating being characterized by having a crystallinity index of less than 1.15 if dried and allowed to stand for 30 days at 20° C., to form a first PVDC coating;

(b) coating the PVDC-coated first sealant web formed in step a) with a second PVDC, the second coating being characterized by having a crystallinity index of less than 1.15 if dried and allowed to stand for 30 days at 20° C. and, if the base film is nylon film, polyester film or polypropylene film, the second PVDC coating being further characterized by a crystallinity index of less than 1.15 if dried and allowed to stand for 30 days at 20° C., and a crystallinity index of from 1.12 to 1.25 if dried and allowed to stand for 5 days at 40° C.;

(c) passing the base film over a hot roll, said base film being in contact with said hot holl, and said hot roll being at a temperature higher than about 70° C.; and (d) bringing the PVDC-coated surface of the PVDC-coated first sealant web, formed during steps (a) and (d), into contact with the base film and nipping the PVDC-coated first sealant web to the base film, between a nip roll and the hot roll, to form a laminate.

Process G comprises:

(a) coating the base film with a first PVDC, the coating being characterized by having a crystallinity index of less than 1.15 if dried and allowed to stand for 30 days at 20° C. and, if the base film is selected from nylon film, polyester film or polypropylene film, the first PVDC coating being further characterized by having a crystallinity index of from 1.12 to 1.25 if dried and allowed to stand for 5 days at 40° C.;

(b) drying the first PVDC coating;

(c) coating a first sealant web, having a surface tension of at least 42 dynes/cm with a second PVDC, the coating being characterized by having a crystallinity index of less than 1.15 if dried and allowed to stand for 30 days at 20° C.; (d) drying the second PVDC coating;

(e) passing the base film over a hot roll, said base film being in contact with said hot roll, and said hot roll being at a temperature higher than about 70° C.; and (f) bringing the PVDC-coated surface of the PVDC-coated first sealant web into contact with the PVDC-coated surface of the PVDC-coated base film and nipping the PVDC-coated first sealant web to the PVDC-coated base film, between a nip roll and the hot roll, to form a laminate.

In a preferred embodiment of the process of the present invention, the PVDC layers in contact with and furthest away from the base film are combined into a single layer, said PVDC layer being characterized by having a crystallinity index of less than 1.15 if dried and allowed to stand for 30 days at 20° C. and of from 1.12 to 1.25 if dried and allowed to stand for 5 days at 40° C.

In another embodiment, when the base film is a cast nylon film the PVDC coating which is furthest away from the base film i.e. the layer which contacts the sealant web, is characterized by having a crystallinity index of less than 1.05 if dried and allowed to stand for 30 days at 20° C.

In particularly preferred embodiments the sealant web has a surface, adjacent to the PVDC coating, of a material selected from the group consisting of (a) a copolymer of ethylene and vinyl acetate, (b) a blend of a copolymer of ethylene and vinyl acetate and at least one of (i) a copolymer of ethylene and at least one $C_4$–$C_{10}$ $\alpha$-olefin having a density of from 0.915 to 0.955 g/cm$^3$ and (ii) a homopolymer of ethylene having a density of from 0.915 to 0.955 g/cm$^3$. Preferred copolymers of ethylene and $\alpha$-olefins(s) are ethylene/butene-1, ethylene/ octene-1 and ethylene/butene-1/octene-1copolymers.

Preferably the vinyl acetate content of the copolymer of ethylene and vinyl acetate (EVA) is between about 1.0 and about 20 weight percent and the weight ratio of the EVA to ethylene homopolymer, ethylene copolymer or blend of said copolymer and homopolymer is in the range of 2:98 to 50:50, especially in the range of 2:98 to 20:80.

In another embodiment the sealant web is an EVA copolymer having a vinyl acetate content of between about 1.0 and about 15 weight percent and said sealant web contains a slip additive. The slip coefficient of the sealant web, as measured by ASTM Procedure D-1894 may be less than 0.4, especially less than 0.3.

In a further embodiment the surface of the sealant web adjacent to the PVDC coating has been corona discharge-treated to a level between 38 and 45 dynes/cm prior to lamination.

In another preferred embodiment, the base film is a nylon film, especially a film of nylon 6, nylon 66 or a condensation copolymer of $\epsilon$-caprolactam and hexamethylenediamine adipate (sometimes referred to as nylon 6/66).

In a further embodiment the base film has a metal-coated surface, said surface being between the base film and the PVDC coating. Said metal coating may be in the form of a metal foil or, for example, a vacuum deposited film. Preferably the metal is aluminum.

In another embodiment the sealant web is a copolymer of ethylene and vinyl acetate, having a vinyl acetate content between 2 and 40 weight percent, bonded to a carrier web. Preferably the carrier web is made from an ionomer.

In a further embodiment the base film has an aluminum-coated surface, said surface being sandwiched between the base film and the PVDC coating.

In yet another embodiment a layer of PVDC is interposed between the first and second PVDC coatings, said interposed layer of PVDC being characterized by being capable of developing crystallinity to a level such that the interposed crystalline PVDC layer so formed resists attack by an organic solvent, as measured by the Solvent Haze Test described hereinbelow, said organic solvent being capable of dissolving PVDC coatings having a crystallinity index of less than 1.05. An example of a PVDC dispersion suitable for forming the interposed layer is available under the trade mark Serfene 411.

In the Solvent Haze Test, the PVDC coating, when dry and after allowing crystallinity to develop, is sprayed with the organic solvent. If the PVDC coating has developed sufficient crystallinity, the PVDC coating will be unaffected by the solvent. If, however, the PVDC coating is insufficiently crystalline the solvent will either turn the PVDC coating turbid in appearance or will dissolve portions or all of the PVDC coating.

Crystallinity index, as defined in the present specification, is determined using infra-red spectroscopy by obtaining an attenuated total reflectance infra-red spectrum of the coated film. Crystallinity index may be measured using a Perkin Elmer* 467 infra-red spectrophotometer and a Wilks* ATR-9 attenuated total reflectance unit with a germanium crystal cut at 45°. In the method, rectangles of film are placed on each side of the germanium crystal (i.e. two rectangles of film are used), with the PVDC-coated side of the film against the crystal. The reference beam attenuator is set at 85% at 1150 cm$^{-1}$ and the sample is scanned between 950 cm$^{-1}$ and 1150 cm$^{-1}$. The absorbances A of the background, at 1115 cm$^{-1}$, and at the peaks, at 1070 cm$^{-1}$ and 1042 cm$^{-1}$, are measured. Crystallinity index is calculated by dividing the difference between $A_{1042}$ and $A_{1115}$ by the difference between $A_{1070}$ and $A_{1115}$.

*denotes trade mark.

The following description of the invention is primarily directed to coating and laminating nylon base films. Similar techniques to those used for nylon film, particularly to those used for oriented nylon film, may be used for the polyester and polypropylene base films. However, cast nylon films, particularly thin cast nylon films tend to require more stringent control when coating with PVDC and laminating the PVDC-coated nylon film to the sealant web because of the sensitivity of cast nylon film to moisture and heat. Base films made from a sealant web require a slip coefficient of less than about 0.4 in order to prevent sticking of the film to the hot roll.

BRIEF DESCRIPTION OF THE DRAWINGS

The invention may be more fully understood by reference to the drawings in which

Referring to FIG. 1, suitable apparatus comprises a first coating station 10, a first dryer 11, a second coating station 12, a second dryer 13, and nip roll assembly 14. Apparatus for supplying base film and sealant web and for winding up the laminate are not shown.

Figure 1:
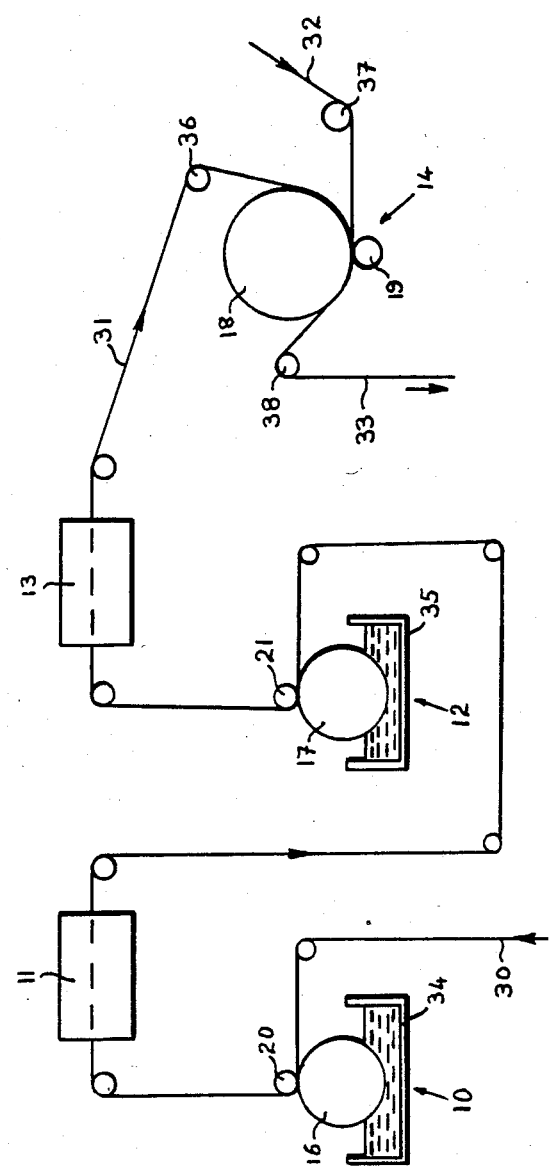
FIG. 1 shows in diagrammatic form a process of the present invention.

First coating station 10 comprises a pan 34 for holding a PVDC dispersion, direct gravure roll 16 and nip roll 20, associated with gravure roll 16. Second coating station 12 is similar to first coating station 10 with pan 35, direct gravure roll 17 and nip roll 21. Direct gravure rolls 16 and 17 and associated nip rolls may be replaced by Meyer* rods, reverse gravure rolls or other coating apparatus if desired. It will be recognised by those skilled in the art that if apparatus which subjects the PVDC dispersion to relatively high shear is used, then the PVDC dispersion may have to be modified to minimize foaming e.g. with the addition of iso-propyl alcohol.
*denotes trade mark.

Nip roll assembly 14 comprises a lamination roll 18, which has means for heating (not shown), an associated nip roll 19, lay-on roll 36 which is adapted to guide PVDC-coated nylon film onto lamination roll 18, lay-on roll 37, which is adapted to guide sealant web into the nip between nip roll 19 and lamination roll 18, and take-off roll 38 which may be positioned to permit a laminate to remain in contact with lamination roll 18 after passing through the nip between lamination roll 18 and nip roll 19.

There are various idler rollers (some are shown but not identified in the drawing) which are adapted, for example, to guide film through first dryer 11, after leaving first coating station 10 and before passing to second coating station 12.

In one embodiment of the present invention, nylon film 30 is passed through the first coating station 10 which may comprise a direct gravure roll 16 and associated nip roll 20. A first PVDC coating is applied at the first coating station. Typically 3.25 to 6.51 g/m$^2$(2-4 lb/ream) PVDC coating i.e. 6.50 to 13.02 g/m$^2$ of 50% PVDC aqueous dispersion, is coated onto the nylon film if the nylon film is oriented, and 2.44 to 3.25 g/m$^2$ of PVDC coating i.e. 4.88 to 6.51 g/m$^2$ of 50% PVDC aqueous dispersion, is coated onto the film if the nylon film is substantially unoriented e.g. is cast film. The first PVDC coating is dried in first dryer 11 before being coated with the second PVDC coating in the second coating station 12. Typically 3.25 to 6.51 g/m$^2$ of PVDC coating is direct gravure coated onto the PVDC-coated film by means of direct gravure roll 17 and associated nip roll 21. Even cast nylon film may, at this stage, be coated with up to 6.51 g/m$^2$ of PVDC coating, or more, as the first PVDC coating tends to prevent water in the PVDC dispersion from wrinkling or curling the nylon film. The second PVDC coating is dried in second dryer 13. The amount of heat applied to the PVDC-coated nylon film, in second dryer 13 is controlled to ensure that the second PVDC coating is dried sufficiently and has sufficient so-called "green tack", but is not heated to the extent that a relatively non-adherent skin forms on the PVDC coating.

The term "green tack", used in the art, may be a misnomer, as it is believed that the dried PVDC coating is not tacky in the normally accepted sense of the word. The term is believed to relate to a lack of crosslinking in the PVDC coating. In the present process, an indication of the sufficiency of the green tack may be ascertained by measuring the surface temperature of the PVDC coating just prior to the PVDC-coated film leaving the second dryer. At surface temperatures less than about 70° C., the PVDC coating has sufficient green tack for subsequent lamination. At surface temperatures above about 70° C. e.g. 85° C., the PVDC coating may have insufficient green tack for the PVDC coating to adhere well to the sealant web. The PVDC-coated nylon film 31 which exits from second dryer 13 is wrapped around heated lamination roll 18, the nylon film contacting roll 18. Sealant web 32 is fed onto PVDC-coated nylon film 31 so that the sealant web 32 contacts the PVDC coating. The PVDC-coated nylon film 31 and sealant web 32 are nipped together by the application of nip roll 19 to the lamination roll 18. The laminate may then be passed further round heated lamination roll 18 or into a hot zone in order to strengthen the bond between the sealant web and the PVDC coating. The laminate so formed, 33, is wound up on a roll, not shown.

In some embodiments of the present invention a single PVDC coating can be used which performs the functions of both layers of PVDC. The crystallinity index specifications for the single PVDC must meet the specifications of the two PVDC layers. The single PVDC may be applied in two steps as indicated hereinabove or in a single step. The single step process is particularly useful in the case of oriented nylon, polyester or polypropylene films, whereas the two step process may be desirable for cast nylon film, because of the tendency of the film to curl in the presence of moisture.

In the single step process wherein the PVDC coating is laid down in a single application, only one of the coating stations and associated dryer will be used. Furthermore, for a structure which has an interposed layer of crystalline PVDC a third coating station and associated dryer (neither of which are shown in the drawing) will be required.

When dealing with cast i.e. substantially unoriented, nylon film it may be necessary to apply tension to the film in the transverse direction in order to prevent curl as the film passes through the dryer. This is particularly desirable in dryers which apply heat only to one side of the film e.g. a Faustel* dryer.
*denotes trade mark.

When dealing with oriented nylon, oriented polyester or oriented polypropylene base films, it may be desirable to pass the coated film through a dryer, under very low longitudinal tension. A so-called floater dryer is suitable. Such a dryer avoids pulling the film under tension, which might otherwise induce wrinkling in the film.

When the base film is a sealant web it is necessary that the film have a slip coeficient of less than about 0.4, preferably less than about 0.3, and especially about 0.2. Sealant webs having a slip coefficient of about 0.2 are sometimes referred to by those skilled in the art as "high slip" films.

The base film may also have a metal coating to make the final film structure substantially impermeable to oxygen. The metal, e.g. aluminum, may be applied by known methods, for example by vacuum deposition. The amount of metal deposited on the base film depends on the required oxygen permeability of the final film structure. Typically, aluminum is deposited until an optical density of about 2.5 is attained. Optical density is defined as the logarithm of the quotient of, as dividend, the intensity of a 500 nm wavelength light beam prior to passage through the film structure and, as divisor, the intensity of the light beam after passage through the film structure. Optical density may be measured using a Cary* 210 UV-visible spectrophotometer. The aluminum-coated base film laminate is usually coated with a PVDC coating adjacent to the aluminum so that the mechanical integrity of the aluminum coating remains when the structure is used in packaging operations e.g. is not damaged by pinholing or scratching, as it may be if on the outside of the package.

*denotes trade mark.

It is often desirable to apply coloured designs, and/or printed matter on the base film-PVDC coating-sealant web structure. In the context of the present invention such designs and/or printed matter may be placed on the structure using inks applied to the base film or the sealant web. The printing would therefore be between the base film and the PVDC coating or between the PVDC coating and the sealant web. Corona discharge treatment of the surface to be printed may be desirable. The extent of ink coverage depends in part on the bond strength between the ink and the base film and between the ink and the PVDC coating. It is desirable to select an ink that bonds well to the PVDC coating and to the base film in order to ensure that the bond strengths between adjacent layers in the final structure are sufficient for the anticipated end use.

In the event that PVDC-coated base film is available instead of uncoated film, the PVDC-coated base film may need to be heated in order to substantially destroy any crystallinity in the PVDC. For example, in the case where the PVDC coating of the pre-coated base film would have a crystallinity index of less than 1.15 when dry and if allowed to stand for 30 days at 20° C., and from 1.12 to 1.25 when dry and if allowed to stand for 5 days at 40° C., the PVDC-coated base film may be directly heat laminated by passing the PVDC-coated base film through the nip roll assembly, provided the temperature of lamination roll 18 is sufficiently high e.g. greater than about 85° C., to substantially destroy any crystallinity which may have been developed in the PVDC coating. The PVDC-coated base film should be heated to an extent sufficient to reduce or maintain the crystallinity index at less than about 1.05. It will be understood by those skilled in the art that such PVDC-coated base film, available on rolls, would have a slip sheet between the layers of film on the roll or the PVDC coating would contain an antiblock agent e.g. wax or talc.

The base film, pre-coated with a PVDC coating may also be heat laminated to a sealant web by PVDC coating at the second coating station with a PVDC characterized by having a crystallinity index of less than 1.15 when dry and if allowed to stand for 30 days at 20° C., and subsequently drying and heat laminating as described hereinbefore.

It should be understood that, in the present specification, when referring to films pre-coated with PVDC, the number of days, after which crystallinity index of the PVDC is determined, is measured from the time immediately after the applied PVDC dispersion has been dried. In the case where the film is coated by a person (the coater) other than the person who does the laminating (the laminator), it may not be apparent to the laminator how many days have lapsed since the film was coated and at what temperature the film was stored. The laminator may therefore need to make inquiry regarding the characterization of the PVDC used as the coating for the base film.

In the event that the base film is cast nylon film or a sealant web the lamination temperature should be kept as low as possible to minimize shrinkage and other effects associated with heating the nylon film to too high a temperature. In these cases it is advantageous for the PVDC coating next to the sealant web to have a low heat sealing temperature. Generally, such PVDC coatings have a crystallinity index of less than about 1.05 when dry and if allowed to stand for 30 days at 20° C. Three PVDC dispersions which are suitable in this regard are Serfene 2011, Serfene 2012, Serfene 2015.

When the sealant web is not PVDC-coated, it is believed important that the crystallinity index of the PVDC coating which will contact the sealant web be less than about 1.05 immediately prior to lamination. The temperature of the PVDC-coated base film, upon leaving the second dryer should be less than about 75° C. in order to sufficiently dry the PVDC coating and to retain the so-called "green tack" of the dried PVDC coating. At temperatures greater than about 75° C. the "green tack" or adhesive nature of the dried PVDC coating may be insufficient. The temperature of the lamination roll should be at least about 70° C., preferably at least 85° C., in order to cause the PVDC coating to remain in or revert to a substantially amorphous state. More preferably the temperature of the lamination roll should be at least about 95° C. The temperature of the lamination roll should be less than the melting temperature of the sealant web and preferably at least about 20° C. less than the melting temperature of the sealant web. Although not wishing to be bound by any theory, it is believed that the selection of temperature at which the lamination roll is operated depends to a certain extent on the softening point of the sealant web.

As indicated hereinbefore, the sealant webs may contain slip additives.

PVDC coatings of the type useful for coating the base film and/or heat laminating to the sealant web generally have oxygen permeabilities of the order of 15.6 ml/m$^2$/atmos./day. This is believed sufficient for most applications. In the event that lower oxygen permeability is required, a more crystalline PVDC coating within the range of PVDC coatings of the present invention may be selected. Alternatively the base film may be coated with PVDC on both sides. As a further alternative, a crystalline PVDC coating e.g. one having a crystallinity of greater than about 1.30 when dry, may be sandwiched between the first and second PVDC coatings used in the present invention. As stated hereinbefore, an aluminum coating may be placed between the base film and the PVDC coating. Using vacuum deposited aluminum, oxygen permeabilities in the order of 0.75 ml/m$^2$/atmos./day are attainable.

Nylon copolymer e.g. nylon 6/66, films are preferred for applications where resistance to pinholing of the package is required. A preferred laminate for packaging cheese comprises a nylon base film and a sealant web of a film made from a blend of a linear copolymer of ethylene and a $C_4$–$C_8$ α-olefin and a copolymer of ethylene and vinyl acetate.

It may be seen from the foregoing that, for cast nylon film, one process comprises coating the film with two coatings of PVDC prior to heat laminating the PVDC-coated film to the sealant web. The first PVDC coating is applied under conditions which minimize the chance of occurrence of curling or wrinkling, caused by high temperatures and/or the presence of excess quantities of moisture. This may be accomplished primarily by ensuring that as little as possible of the PVDC dispersion is applied to the nylon film, but it must be sufficient to provide complete coverage of the nylon film, with PVDC, after drying, so that there is little chance of absorption of water by the nylon film during the second application of PVDC dispersion. For these reasons the first layer of PVDC dispersion is usually applied at about 2.44 to 3.25 g/m$^2$ (dry basis). In addition it is desirable to control the transverse tension on the film as it passes through the dryer. The level of tension required will vary according to the type of nylon film, the quantity of PVDC emulsion applied, the temperature of the dryer and the type of drier e.g. one-side or two-side direction of the heat towards the film. Typically tension levels from 4 to 7 N/m width of film are desirable.

The second coating of PVDC may be applied at from 2.44 to 6.51 g/m$^2$ (dry basis), although 2.44 to 3.25 g/m$^2$ is usually sufficient to impart the required moisture and oxygen permeability level to the final film laminate structure.

The thinner the cast nylon film, the more important it is to keep the rate of application of the first coating of PVDC at a low level e.g. from about 2.44 g/m$^2$ to 2.85 g/m$^2$, and to control the transverse tension of the coated film as it passes through the dryer.

For cast nylon, however, a preferred process is to coat the sealant web with PVDC, thus completely overcoming the problem of moisture sensitivity of the nylon. In addition to this advantage, there is a further advantage that a single coating of PVDC may be selected.

A cast nylon film is sensitive to wrinkling at elevated temperatures, the temperature of the laminating roll should be as low as possible, and/or the time during which the nylon film is in contact with the laminating roll should be kept to the minimum necessary to achieve the required bond strength of the laminate.

Oriented base films useful in the present invention are not as sensitive to temperature and moisture as cast nylon film. Accordingly the PVDC coating may be applied in two separate layers or as a single layer. Higher dryer temperatures and laminating temperatures may be used and transverse tensioning of the film as the film passes through the drier may not be required. With oriented base films a single application of PVDC dispersion is preferred.

When processes are used in which the sealant web is coated with PVDC it is essential that the surface of the sealant web which is to be coated with PVDC has a surface tension of at least 38 dynes/cm. Treatment of the surface, with ozone or other oxidizing chemicals or with corona discharge, as is known in the art, is required in order to bring the surface tension to above the minimum level required. Corona discharge treatment is preferred.

Where coating and laminating facilities are not owned by the same manufacturer, or when it is not convenient, for reasons of flexibility, to combine coating and laminating facilities in an in-line process, coating and laminating may be accomplished in two steps in a so-called out-of-line process. In such a process, the base film or sealant web is coated with one or more PVDC coatings and wound up on a roll. To prevent blocking of the PVDC-coated film upon unwinding a slip sheet may be used or the last PVDC coating may be formulated to include slip and anti-block agents e.g. wax, talc, silica. The wound roll may then be stored in preparation for lamination to the sealant web or base film, as appropriate. The PVDC-coated film may then, at an appropriate time, be heat laminated to the other film according to the present invention.

In processes where an uncoated sealant web is laminated to a PVDC-coated base film in order to ensure that the PVDC coating will adhere to the sealant web, it is believed necessary for the PVDC coating to have a crystallinity index, at the time of lamination, of about 1.05 or less. This may be accomplished by heating the PVDC-coated film immediately prior to or at the time of lamination. Example 7, hereinafter, illustrates the out-of-line process.

The invention may be illustrated further by reference to the following examples, of which Example 1 typifies the prior art.

In the Examples, melt index is measured according to the procedure of ASTM D-1238 (condition E).

EXAMPLE 1

A 15 $\mu$m thick film of an oriented nylon copolymer (a copolymer of 10 wt % $\epsilon$-caprolactam and 90 wt % hexamethylenediamine adipate) was direct gravure coated at 30.5 m/min with 6.175 g/m$^2$ of Serfene 2011 PVDC dispersion to which 5% by weight of isopropyl alcohol had been added. The PVDC of Serfene 2011 has a crystallinity index, when dry and after storing at 20° C. for 30 days, of 1.05, and after storing at 40° C. for 5 days, of 1.15. The coating was dried in a roll support arch dryer to a temperature of 70° C. as measured by a non-contacting infrared radiation pyrometer. The PVDC-coated film was passed over a laminating roll held at 115° C. for a residence time of 0.33 seconds on the hot roll. A 51 $\mu$m sealant web, comprising a blend of 85 wt % of a linear ethylene/butene-1 copolymer having a density of 0.919 g/cm$^3$ and a melt index of 0.75 and 15 wt % of a high pressure polyethylene viz. a homopolymer of ethylene, having a density of 0.920 g/cm$^3$ and a melt index of 0.8 dg/min, and 75 ppm by weight of the blend of erucamide (a slip additive), said sealant web having been corona discharge treated to a surface tension level of 38 dynes/cm, was laminated to the PVDC-coated nylon as described herein.

The resulting laminate was stored for 5 days at 20° C. The laminate bond strength was then measured, using a Suter tester, and found to be between 11 and 20 g/cm.

Other similar sealant webs containing high pressure polyethylenes having melt indices from 2 to 10 dg/min give similar results.

EXAMPLE 2

Example 1 was repeated except that the sealant web comprised a blend of 85 parts by weight of a linear ethylene/butene-1 copolymer having a density of 0.919 g/cm$^3$ and a melt index of 0.75, 15 parts by weight of a high pressure polyethylene having a density of 0.920 g/cm$^3$ and a melt index of 0.8 dg/min, and 15 parts by weight of an ethylene/vinyl acetate copolymer having a vinyl acetate content of 12 wt % of the copolymer and a melt index of 0.35 dg/min, available under the trade mark Elvax 3135X. The sealant web had a slip coefficient of about 0.2.

The laminate bond strength was tested after 5 days' storage at 20° C. and found to be 630 g/cm.

EXAMPLE 3

Example 2 was repeated except that Serfene 2060 PVDC dispersion was used instead of the Serfene 2011 PVDC dispersion. The PVDC of Serfene 2060 has a crystallinity index, when dry and after storage at 20° C. for 30 days, of 1.10, and after storage at 40° C. for 5 days, of 1.19.

The laminate bond strength was tested after 5 days' storage at 20° C. and found to be 630 g/cm.

EXAMPLE 4

Example 3 was repeated except that the oriented nylon copolymer film was replaced by a 25 μm thick cast film made from a copolymer of 10 wt % ε-caprolactam and 90 wt % hexamethylenediamine adipate.

The laminate bond strength was tested after 5 days storage at 20° C. and found to be 630 g/cm. However, the laminate was severely curled in both the machine and transverse directions, indicating that the quantity of moisture driven off in the dryer, and perhaps the temperature of the hot laminating roll, were too high for the lamination of cast film.

EXAMPLE 5

The cast nylon film of Example 4 was coated with 3.25 g/m² of Serfene 2060 PVDC dispersion and dried. The coated film was then wound up with a high density polyethylene slip sheet. A few hours later this coated nylon film was coated with 3.25 g/m² Serfene 2015 PVDC dispersion, the slip sheet being removed and rewound on a secondary winder. The PVDC of Serfene 2015 has a crystallinity index, when dry and after storage at 20° C. for 30 days, of 1.00, and after storage at 40° C. for 5 days, of 1.15. The Serfene 2015 PVDC coating was dried in a roll support arch drier to a temperature of 70° C. as measured by a non-contacting infrared radiation pyrometer. The PVDC-coated film was passed over a laminating roll held at 90° C. for a residence time of 0.33 seconds on the hot roll. A sealant web as described in Example 2 was laminated to the PVDC-coated nylon film.

The resulting laminate was substantially curl-free and had a bond strength, after 5 days' storage at 20° C., of at least 500 g/cm.

EXAMPLE 6

An 11 μm thick oriented nylon copolymer film (10 wt % ε-caprolactam and 90 wt % hexamethylene diamine adipate) was direct gravure coated with 7.8 g/m² of Serfene 2060 PVDC dispersion to which 5 wt % isopropyl alcohol had been added. The coated film was dried, in a roll support arch dryer, to a temperature of 70° C. The coated film was passed over a laminating roll held at 115° C. for a residence time of 0.33 seconds on the hot roll, and was laminated to a sealant web made from a blend of 50 parts by weight of an ethylene/vinyl acetate copolymer having a density of 0.940 g/cm³, a melt index of 1.2 and a vinyl acetate content of 18 wt % of the copolymer, available under the trade mark Ultrathene UE-632, 42.5 parts of a linear ethylene/butene-1 copolymer having a density of 0.919 g/cm³ and a melt index of 0.75 and 7.5 parts by weight of a high pressure polyethylene having a density of 0.920 g/cm³ and a melt index of 0.8 dg/min, and 75 ppm by weight of the blend of erucamide.

The resulting laminate was stored for 5 days' at 20° C. The laminate bond strength was then tested and found to be at least 630 g/cm.

EXAMPLE 7

A 15 μm thick oriented nylon 66 film was coated with 4.06 g/m² of a mixture of 97.7 parts by weight Serfene 2060 PVDC dispersion, 2 parts by weight of DL-96* wax emulsion and 0.3 parts by weight of OX-50* silicon dioxide anti-block agent. The coated film was dried, wound up and stored for 6 months at room temperature. The PVDC coating was found to then have a crystallinity index of 1.31±0.02.
*denotes trade mark.

This coated film was then passed through a roll support arch dryer at 30.5 m/min for a residence time of 2.5 seconds. The temperature of the drier was 110° C. The coated film was then passed over a laminating roll held at 115° C. The sealant web of Example 6 was laminated to the PVDC-coated nylon film.

The bond strength of the resulting laminate, after 5 days storage at 20° C. was at least 500 g/cm.

EXAMPLE 8

Example 6 was repeated, except that the sealant web was made from an ethylene/vinyl acetate copolymer having a melt index of 1.5 and a vinyl acetate content of 6 wt %, available from C-I-L Inc. under the trade mark 1060.

The bond strength of the resulting laminate, after 5 days storage at 20° C. was at least 630 g/cm.

EXAMPLE 9

A 15 μm thick oriented nylon copolymer film, as in Example 1, was direct gravure coated with 4.06 g/m² of Serfene 2060 PVDC dispersion with 5 wt % isopropyl alcohol, and dried to a temperature of 70° C. prior to passing over a laminating roll held at 115° C. at a speed of 30–35 m/min. The residence time on the laminating roll was 0.33 seconds. The PVDC-coated nylon was laminated to an 18 μm thick two-side acrylic-coated biaxially oriented polypropylene film. The resulting laminate was coated on the uncoated side of the nylon film with 4.06 g/m² of Serfene 2060 PVDC dispersion containing 5 wt % isopropyl alcohol. This latter PVDC coating was laminated to the sealant web of Example 6.

The laminate was stored for 5 days at 20° C. before measuring bond strengths. The bond strength between the coated oriented polypropylene and the nylon film was found to be about 150 g/cm, and between the EVA-containing film and the nylon film was at least 630 g/cm.

EXAMPLE 10

A 15 μm thick nylon copolymer film with Serfene 2060 PVDC coating was prepared and laminated to a one-side nitrocellulose-coated regenerated cellulose film, substantially in the manner described in Example 1. The resulting laminate was coated on the second side of the nylon and laminated to the EVA-containing film, as described in Example 9.

The bond strength between the nylon film and the cellulose film after 5 days storage at 20° C. was found to be 78 g/cm.

EXAMPLE 11

A 15 μm thick film oriented copolymer nylon was coated with Daran* 820 PVDC dispersion at 6.99 g/m².

The resulting coated film was dried and laminated at 115° C. to the EVA-containing film of Example 6.
*denotes trade mark.

The bond strength, after 5 days storage at 20° C., was found to be 350 g/cm.

EXAMPLE 12

A 51 μm thick cast nylon 6 film was coated with 6.99 g/m$^2$ Serfene 2060 dispersion with 5 wt % iso-propyl alcohol and passed through a dryer controlled at 120° C., for a residence time of 4 seconds. The coated film leaving the dryer had a temperature of 74° C. The resultant film was laminated at the sealant web of Example 6.

The bond strength, after 5 days storage at 20° C. was found to be 275 g/cm. The film was slightly curled, but was successfully used in thermoforming operations on a Multivac* 8000 vacuum thermoformer.
*denotes trade mark.

EXAMPLE 13

A 76 μm thick cast nylon 66 film was coated with 3.49 g/m$^2$ Serfene PVDC 2060 dispersion with 5 wt % iso-propyl alcohol. The coated film leaving the dryer had a surface temperature of 72° C. The resultant film was laminated to 127 μm thick sealant web made from a blend of 85 parts by weight of an ethylene/butene-1 copolymer having a density of 0.919 g/cm$^3$ and a melt index of 0.75 dg/min and 15 parts by weight of an ethylene/vinyl acetate copolymer having a vinyl acetate content of 12 wt % of the copolymer and a melt index of 0.35 dg/min. The PVDC-coated film was passed over a laminating roll held at 112 ° C. for a residence time of 0.7 seconds on the hot roll, 60% of that time being in contact with the sealant film.

The laminate bond strength was tested after 5 days storage at 20° C. and found to be 560 g/cm. The laminate was flat and thermoformable.

EXAMPLE 14

A 11 μm thick oriented polyester film i.e. polyethylene terephthalate film, corona discharge treated to a surface tension level of 40 dynes/cm, was coated with 4.88 g/m$^2$ of Serfene 2060 PVDC dispersion with 5 wt % iso-propyl alcohol. The coated film was passed through a dryer maintained at 138° C. The surface temperature of the coated film leaving the dryer was 70° C. The film was passed over a laminating roll held at 113° C. for a residence time of 0.3 seconds. The coated film was laminated to the sealant web of Example 13.

The laminate bond strength was tested after 5 days' storage at 20° C. and found to be at least 630 g/cm.

EXAMPLE 15

A sealant web made from 85 parts by weight of a linear ethylene/butene-1 copolymer having a density of 0.919 g/cm$^3$ and a melt index of 0.75 dg/min and 15 parts by weight of an ethylene/vinyl acetate copolymer having a vinyl acetate content of 18% and a melt index of 0.7 dg/min was corona discharge treated to a level of about 42 dynes/cm. The sealant web had a slip coefficient higher than 0.5. The sealant web was coated with 4.3 g/m$^2$ of Serfene 2015 PVDC dispersion containing 10% isopropyl alcohol. The coating was dried and then nipped to a 25 μm thick nylon 66 film while the nylon film was in contact with a hot roll, heated to 92° C.

The resulting laminate had a bond strength, measured after 5 days at 20° C. of at least 600 g/cm$^3$ and an measured oxygen permeability of less than 0.8 ml/m$^2$/day/atm.

EXAMPLE 16

The sealant web of Example 2 was corona discharge treated to a level of about 42 dynes/cm and then coated with 4.8 g/m$^3$ of Serfene 2011 PVDC dispersion, dried and wound up on a roll, with a slip sheet. Subsequently the PVDC-coated sealant web was unwound and coated with 4.8 g/m$^2$ of Serfene 2015 PVDC dispersion, dried and nipped to a base film which was identical to the sealant web. The base film was in contact with the hot roll, which was heated to 8.2° C.

The resulting laminate had a bond strength, measured after 5 days at 20° C. of at least 600 g/cm$^3$ and an oxygen permeability of 7.8 ml/m$^2$/day/atm.

The embodiments of the invention in which an exclusive property or privilege is claimed are defined as follows:

1. A film laminate comprising a base film and a first sealant web with a coating of polyvinylidene chloride sandwiched therebetween, said first sealant web being selected from the group consisting of (a) film made from a copolymer of ethylene and vinyl acetate, and (b) a film made from a blend of (i) a copolymer of ethylene and vinyl acetate with (ii) a homopolymer of ethylene, or a copolymer of ethylene and one or more C$_4$ to C$_{10}$ α-olefins, said homopolymer or copolymer having a density of from about 0.915 to about 0.955 g/cm$^3$, or blends of said homopolymer and copolymer, said base film being selected from the group consisting of oriented nylon film, oriented polyester film, oriented polypropylene film, cast nylon film and a second sealant web, said second sealant web being selected from the same group as said first sealant web and having a slip coefficient of less than about 0.4, said polyvinylidene chloride coating consisting of at least one layer having a crystallinity index of less than 1.15 if dried and allowed to stand for 30 days at 20° C. and, if the base film is selected from nylon film, polyester film or polypropylene film, the layer in contact with the base film having a crystallinity index of from 1.12 to 1.25 if dried and allowed to stand for 5 days at 40° C.

2. A process for forming the laminate of claim 1 comprising bringing the base film and the first sealant web together between a nip roll and a hot roll, said polyvinylidene chloride coating having been applied to at least the base film or the first sealant web, wtih the proviso that if the first or second sealant web is in contact with the hot roll then said web which contacts the hot roll has a slip coefficient of less than about 0.4.

3. A process according to claim 2 comprising:

(a) heating a polyvinylidene chloride-coated base film or first sealant web to an extent sufficient to reduce the crystallinity index of the polyvinylidene chloride coating to less than about 1.05;

(b) passing the heated polyvinylidene chloride-coated base film or first sealant web over a hot roll;

(c) when a polyvinylidene chloride-coated base film is used, bringing the first sealant web into contact with the polyvinylidene chloride coating and nipping said first sealant web to the polyvinylidene chloride coated base film, between the nip roll and the hot roll, to form a laminate; and when a polyvinylidene chloride-coated first sealant web is used, bringing the base film into contact with the polyvinylidene chloride-coated first sealant web, between the nip roll and the hot roll, to form a laminate.

4. A process according to claim 2 comprising:
  (a) heating a polyvinylidene chloride-coated base film to an extent sufficient to reduce the crystallinity index of the polyvinylidene chloride coating to less than about 1.05, said polyvinylidene chloride having a crystallinity index of less than 1.15 if dried and allowed to stand for 30 days at 20° C., and if the base film is selected from nylon film, polyester film or polypropylene film, the polyvinylidene chloride coating having a crystallinity index of from 1.12 to 1.25 if dried and allowed to stand for 5 days at 40° C.;
  (b) coating the polyvinylidene chloride-coated base film with an aqueous polyvinylidene chloride dispersion to form a second polyvinylidene chloride coating, said second polyvinylidene chloride having a crystallinity index of less than 1.15 if dried and allowed to stand for 30 days at 20° C.;
  (c) drying and subsequently heating the second polyvinylidene chloride coating until the temperature of the free surface of said second coating is less than 75° C.;
  (d) passing the resulting polyvinylidene chloride-coated base film over a hot roll, said base film being in contact with said hot roll, said hot roll being at a temperature higher than about 70° C., and
  (e) bringing the first sealant web into contact with the second polyvinylidene chloride coating and nipping said first sealant web to the polyvinylidene chloride-coated base film, between a nip roll and the hot roll to form a laminate.

5. A process according to claim 2 comprising:
  (a) heating the polyvinylidene chloride-coated base film to an extent sufficient to reduce the crystallinity index of the polyvinylidene chloride coating to less than about 1.05, said polyvinylidene chloride having a crystallinity index of less than 1.15 if dried and allowed to stand for 30 days at 20° C., and if the base film is selected from nylon film, polyester film or polypropylene film, the polyvinylidene chloride coating having a crystallinity index of from 1.12 to 1.25 if dried and allowed to stand for 5 days at 40° C.
  (b) coating the first sealant web having a surface tension of at least 42 dynes/cm, with an aqueous polyvinylidene chloride dispersion to form a polyvinylidene chloride-coated first sealant web, said polyvinylidene chloride coating on the sealant web having a crystallinity index of less than 1.15 if dried and allowed to stand for 30 days at 20° C.;
  (c) drying the polyvinylidene chloride coating on the first sealant web;
  (d) passing the polyvinylidene chloride-coated base film over a roll, said base film being in contact with said hot roll, said hot roll being at a temperature higher than about 70° C.; and
  (e) bringing the polyvinylidene chloride surface of the polyvinylidene chloride-coated first sealant web into contact with the polyvinylidene chloride surface of the polyvinylidene chloride-coated base film and nipping said polyvinylidene chloride-coated sealant web to the polyvinylidene chloride-coated base film, between a nip roll and the hot roll, to form a laminate.

6. A process according to claim 2 comprising:
  (a) coating the polyvinylidene chloride-coated first sealant web with an aqueous polyvinylidene chloride dispersion to form a second polyvinylidene chloride coating, said second polyvinylidene chloride coating having a crystallinity index of less than 1.15 if dried and allowed to stand for 30 days at 20° C. and if the base film is selected from nylon film, polyester film or polypropylene film, the second polyvinylidene chloride coating having a crystallinity index of from 1.12 to 1.25 if dried and allowed to stand for 5 days at 40° C., and said polyvinylidene chloride coating adjacent to the first sealant web having a crystallinity index of less than 1.15 if dried and allowed to stand for 30 days at 20° C.;
  (b) drying the second polyvinylidene chloride coating;
  (c) passing a base film over a hot roll, said base film being in contact with said hot roll, said hot roll being at a temperature higher than about 70° C., and
  (d) bringing the base film into contact with the second polyvinylidene chloride coating and nipping said base film to the polyvinylidene chloride-coated first sealant web, between a nip roll and the hot roll, to form a laminate.

7. A process according to claim 2 comprising:
  (a) coating the base film with an aqueous polyvinylidene chloride dispersion, the resultant coating having a crystallinity index of less than 1.15 if dried and allowed to stand for 30 days at 20° C. and if the base film is selected from nylon film, polyester film or polypropylene film, the polyvinylidene chloride coating having a crystallinity index of from 1.12 to 1.25 if dried and allowed to stand for 5 days at 40° C.
  (b) drying the polyvinylidene chloride coating;
  (c) passing the polyvinylidene chloride-coated base film over a hot roll, said base film being in contact with said hot roll, and said hot roll being at a temperature higher than about 70° C.; and
  (d) bringing the polyvinylidene chloride-coated surface of a polyvinylidene chloride-coated first sealant web into contact with the polyvinylidene chloride-coated surface of the polyvinylidene chloride-coated base film and nipping the polyvinylidene chloride-coated sealant web to the polyvinylidene chloride-coated base film, between a nip roll and the hot roll, to form a laminate.

8. A process according to claim 2 comprising:
  (a) coating the base film with a first polyvinylidene chloride, the coating having a crystallinity index of less than 1.15 if dried and allowed to stand for 30 days at 20° C. and, if the base film is selected from nylon film, polyester film or polypropylene film, the polyvinylidene chloride coating having a crystallinity index of from 1.12 to 1.25 if dried and allowed to stand for 5 days at 40° C.
  (b) coating the polyvinylidene chloride base film formed in step (a) with a second polyvinylidene chloride, the second coating having a crystallinity index of less than 1.15 if dried and allowed to stand for 30 days at 20° C., to form a second polyvinylidene chloride coating;
  (c) heating said second coating, the temperature of the free surface of said second coating being less than 75° C.

(d) passing the resulting polyvinylidene chloride-coated base film over a hot roll, said base film being in contact with said hot roll, and said hot roll being at a temperature higher than about 70° C., and (e) bringing the sealant web into contact with the second polyvinylidene chloride coating and nipping said sealant web to the polyvinylidene chloride-coated base film, between a nip roll and the hot roll, to form a laminate.

9. A process according to claim 2 comprising:

(a) coating the first sealant web, having a surface tension of at least 38 dynes/cm, with a first polyvinylidene chloride, the coating having a crystallinity index of less than 1.15 if dried and allowed to stand for 30 days at 20° C., to form a first polyvinylidene chloride coating;

(b) coating the polyvinylidene chloride-coated first sealant web formed in step (a) with a second polyvinylidene chloride, the second coating having a crystallinity index of less than 1.15 if dried and allowed to stand for 30 days at 20° C. and, if the base film is selected from nylon film, polyester film or polypropylene film, the polyvinylidene chloride coating having a crystallinity index of from 1.12 to 1.25 if dried and allowed to stand for 5 days at 40° C.;

(c) passing the base film over a hot roll, said base film being in contact with said hot roll, and said hot roll being at a temperature higher than about 70° C.; and (d) bringing the polyvinylidene chloride-coated surface of the polyvinylidene chloride-coated first sealant web, formed during steps (a) and (d), into contact with the base film and nipping the polyvinylidene chloride-coated first sealant web to the base film, between a nip roll and the hot roll, to form a laminate.

10. A process according to claim 2 wherein the first sealant web has a surface, adjacent to the polyvinylidene chloride coating, of a material selected from the group consisting of (a) a copolymer of ethylene and vinyl acetate, (b) a blend of a copolymer of ethylene and vinyl acetate and at least one of (i) a copolymer of ethylene and a $C_4$–$C_{10}$ α-olefin having a density of from 0.915 to 0.955 g/cm$^3$ (ii) a homopolymer of ethylene having a density of from 0.915 to 0.955 g/cm$^3$.

11. A process according to claim 2 wherein the vinyl acetate content of the copolymer of ethylene and vinyl acetate is between about 1.0 and about 20 weight percent and the weight ratio of the copolymer of ethylene and vinyl acetate to the ethylene homopolymer, ethylene copolymer or blend thereof is in the range of 2:98 to 50:50.

12. A process according to claim 2 wherein the base film is a nylon film.

13. A process according to claim 2 wherein the base film is a sealant web having a slip coefficient of less than 0.3.

14. A process according to claim 2 wherein the hot roll is at a temperature of from about 85° C. to the melting temperature of the sealant web.

* * * * *